United States Patent
Gupta et al.

(10) Patent No.: US 9,677,439 B2
(45) Date of Patent: Jun. 13, 2017

(54) SYSTEMS AND METHODS TO MITIGATE $NO_x$ AND HC EMISSIONS

(71) Applicant: Cummins Inc., Columbus, IN (US)

(72) Inventors: Aniket Gupta, Wuhan (CN); Michael J. Cunningham, Greenwood, IN (US); Michael J. Ruth, Franklin, IN (US); Krishna P. Chilumukuru, Columbus, IN (US)

(73) Assignee: Cummins Inc., Columbus, IN (US)

( * ) Notice: Subject to any disclaimer, the term of this patent is extended or adjusted under 35 U.S.C. 154(b) by 145 days.

(21) Appl. No.: 14/600,262

(22) Filed: Jan. 20, 2015

(65) Prior Publication Data

US 2015/0240682 A1    Aug. 27, 2015

Related U.S. Application Data (60) Provisional application No. 61/929,335, filed on Jan. 20, 2014.

(51) Int. Cl.
*F01N 3/035*    (2006.01)
*F01N 3/08*    (2006.01)
(Continued)

(52) U.S. Cl.
CPC ........... *F01N 3/035* (2013.01); *F01N 3/0807* (2013.01); *F01N 3/0835* (2013.01);
(Continued)

(58) Field of Classification Search
CPC ...... F01N 3/035; F01N 3/0835; F01N 3/0842; F01N 3/103; F01N 3/108; F01N 3/2066;
(Continued)

(56) References Cited

U.S. PATENT DOCUMENTS 6,125,629 A    10/2000    Patchett
6,182,443 B1    2/2001    Jarvis et al.
(Continued)

FOREIGN PATENT DOCUMENTS

AT    291685 T    4/2005
CN    101415086 A    4/2009
(Continued)

OTHER PUBLICATIONS

Aniket Gupta, Krishna P. Chilumukuru, Michael J. Cunningham, Govindarajan Kothandaraman, Michael J. Ruth, Lasitha Cumaranatunge, Howard Hess, Aftertreatment Architecture and Control Methodologies for Future Light Duty Diesel Emission Regulations, Proceedings of the ASME 2014 Internal Combustion Engine Division Fall Technical Conference, Oct. 19-22, 2014, 7 pages.

(Continued)

*Primary Examiner* — Jorge Leon, Jr.
(74) *Attorney, Agent, or Firm* — Taft Stettinius & Hollister LLP (57) ABSTRACT

Systems and methods are provided for managing low temperature $NO_x$ and HC emissions, such as during a cold start of an internal combustion engine. The systems and methods include storing $NO_x$ and HC emissions at low temperatures and passively releasing and treating these emissions as the temperature of the exhaust system increases.

32 Claims, 3 Drawing Sheets

(51) Int. Cl.
    *F01N 3/20*     (2006.01)
    *F01N 9/00*     (2006.01)
    *F01N 13/00*     (2010.01)
    *F01N 3/10*     (2006.01)

(52) U.S. Cl.
    CPC .......... *F01N 3/0842* (2013.01); *F01N 3/106* (2013.01); *F01N 3/208* (2013.01); *F01N 9/00* (2013.01); *F01N 9/002* (2013.01); *F01N 13/009* (2014.06); *F01N 13/0093* (2014.06); *F01N 13/0097* (2014.06); *F01N 3/103* (2013.01); *F01N 3/108* (2013.01); *F01N 2340/02* (2013.01); *F01N 2570/12* (2013.01); *F01N 2570/14* (2013.01); *F01N 2610/02* (2013.01); *F01N 2610/06* (2013.01); *F01N 2610/146* (2013.01); *F01N 2610/1406* (2013.01); *F01N 2610/1453* (2013.01); *F01N 2900/1402* (2013.01); *F01N 2900/1404* (2013.01); *F01N 2900/1602* (2013.01); *Y02T 10/24* (2013.01); *Y02T 10/47* (2013.01)

(58) Field of Classification Search
    CPC .... F01N 3/208; F01N 13/009; F01N 2340/02; F01N 2560/026; F01N 2560/06; F01N 2560/14; F01N 2570/12; F01N 2570/14; F01N 2610/02; F01N 2610/06; F01N 2610/12; F01N 2610/1406; F01N 2610/146; F01N 2900/1404; F01N 2900/1602
    USPC ......... 60/274, 276, 286, 295, 297, 298, 299, 60/301, 311, 320
    See application file for complete search history.

(56) References Cited

U.S. PATENT DOCUMENTS

| | | |
|---|---|---|
| 6,182,444 B1 | 2/2001 | Fulton et al. |
| 6,328,936 B1 | 12/2001 | Pfefferle |
| 6,761,025 B1 | 7/2004 | Gladden |
| 6,877,313 B1 | 4/2005 | Phillips et al. |
| 6,912,847 B2 | 7/2005 | Deeba |
| 6,996,975 B2 | 2/2006 | Radhamohan et al. |
| 7,062,904 B1 | 6/2006 | Hu et al. |
| 7,188,469 B2 | 3/2007 | Bonadies et al. |
| 7,229,597 B2 | 6/2007 | Patchett et al. |
| 7,264,785 B2 | 9/2007 | Blakeman et al. |
| 7,334,400 B2 | 2/2008 | Yan et al. |
| 7,377,101 B2 | 5/2008 | Mital et al. |
| 7,485,272 B2 | 2/2009 | Driscoll et al. |
| 7,614,220 B2 | 11/2009 | Breuer et al. |
| 7,674,743 B2 | 3/2010 | Gandhi et al. |
| 7,685,813 B2 | 3/2010 | McCarthy, Jr. |
| 7,799,289 B2 | 9/2010 | Robel |
| 7,805,929 B2 | 10/2010 | Driscoll |
| 7,902,107 B2 | 3/2011 | Patchett et al. |
| 7,998,423 B2 | 8/2011 | Boorse et al. |
| 8,037,674 B2 | 10/2011 | Kupe et al. |
| 8,158,067 B2 | 4/2012 | Choi |
| 8,293,197 B2 | 10/2012 | Winkler et al. |
| 8,381,514 B2 | 2/2013 | Salanta et al. |
| 8,409,515 B2 | 4/2013 | Ren et al. |
| 8,448,424 B2 | 5/2013 | Huang et al. |
| 8,486,341 B2 | 7/2013 | Driscoll et al. |
| 8,601,796 B2 | 12/2013 | Hinz et al. |
| 8,997,481 B2 | 4/2015 | Henry et al. |
| 2004/0118109 A1 | 6/2004 | Gladden |
| 2004/0237507 A1 | 12/2004 | Duvinage et al. |
| 2005/0069476 A1 | 3/2005 | Blakeman et al. |
| 2005/0284134 A1 | 12/2005 | Radhamohan et al. |
| 2006/0260296 A1 | 11/2006 | Theis |
| 2007/0012032 A1 | 1/2007 | Hu |
| 2007/0051096 A1 | 3/2007 | Pfeifer et al. |
| 2007/0082783 A1 | 4/2007 | Hu et al. |
| 2007/0089403 A1 | 4/2007 | Pfeifer et al. |
| 2007/0122317 A1 | 5/2007 | Driscoll et al. |
| 2008/0060348 A1 | 3/2008 | Robel et al. |
| 2008/0072575 A1 | 3/2008 | Yan |
| 2008/0196397 A1 | 8/2008 | Yan |
| 2009/0031702 A1 | 2/2009 | Robel |
| 2009/0133383 A1 | 5/2009 | Shost |
| 2009/0173064 A1 | 7/2009 | Ren et al. |
| 2009/0193794 A1 | 8/2009 | Robel et al. |
| 2009/0222191 A1 | 9/2009 | Andrasko |
| 2009/0293459 A1 | 12/2009 | Shimomura et al. |
| 2010/0005783 A1 | 1/2010 | Keppeler et al. |
| 2010/0024389 A1 | 2/2010 | Gady et al. |
| 2010/0126150 A1 | 5/2010 | Choi |
| 2010/0180579 A1 | 7/2010 | Huang et al. |
| 2010/0180580 A1 | 7/2010 | Boorse et al. |
| 2010/0242438 A1 | 9/2010 | Mital |
| 2010/0242448 A1 | 9/2010 | Mital |
| 2010/0250090 A1 | 9/2010 | Jasinkiewicz et al. |
| 2010/0266471 A1 | 10/2010 | Xu et al. |
| 2010/0319320 A1 | 12/2010 | Mital et al. |
| 2010/0319324 A1 | 12/2010 | Mital |
| 2011/0023463 A1 | 2/2011 | Dobson et al. |
| 2011/0047970 A1 | 3/2011 | Yezerets et al. |
| 2011/0138776 A1 | 6/2011 | Huang et al. |
| 2011/0146252 A1 | 6/2011 | Silver et al. |
| 2011/0162347 A1 | 7/2011 | Katare et al. |
| 2011/0179777 A1 | 7/2011 | Chandler et al. |
| 2011/0192143 A1 | 8/2011 | Andersson et al. |
| 2011/0203262 A1 | 8/2011 | Potter et al. |
| 2011/0265452 A1 | 11/2011 | Geveci et al. |
| 2011/0283680 A1 | 11/2011 | Gekas et al. |
| 2012/0023905 A1 | 2/2012 | Yezerets et al. |
| 2012/0214663 A1 | 8/2012 | Chigapov et al. |
| 2013/0022511 A1* | 1/2013 | Hayashi .............. B01D 53/944 422/169 |
| 2013/0061576 A1 | 3/2013 | Gonze et al. |
| 2013/0232958 A1 | 9/2013 | Ancimer et al. |
| 2013/0305695 A1 | 11/2013 | Henry et al. |
| 2013/0312392 A1* | 11/2013 | Henry ................ F01N 3/0835 60/274 |
| 2014/0090362 A1* | 4/2014 | Eckhoff ............... F01N 3/0821 60/274 |
| 2015/0247437 A1 | 9/2015 | Ancimer et al. |
| 2015/0275730 A1 | 10/2015 | Gupta et al. |

FOREIGN PATENT DOCUMENTS

| | | |
|---|---|---|
| EP | 2230001 A1 | 9/2010 |
| EP | 1458960 B1 | 2/2011 |
| EP | 2279785 A2 | 2/2011 |
| EP | 2685061 A1 | 1/2014 |
| GB | 1212898 | 11/1970 |
| WO | 2006131825 A1 | 12/2006 |
| WO | 2010094313 A1 | 8/2010 |
| WO | 2015086905 A1 | 6/2015 |

OTHER PUBLICATIONS

PCT/US2013/041959, International Search Report and Written Opinion, Sep. 23, 2013, 9 pgs.

* cited by examiner

SYSTEMS AND METHODS TO MITIGATE $NO_x$ AND HC EMISSIONS

CROSS-REFERENCE TO RELATED APPLICATION

The present application claims the benefit of the filing date of U.S. Provisional Application Ser. No. 61/929,335 filed on Jan. 20, 2014, which is incorporated herein by reference in its entirety.

GOVERNMENT RIGHTS

The present invention was made with Government assistance from the U.S. Department of Energy (DOE) under contract No. DE-EE0004125. The U.S. Federal Government may have certain rights therein.

BACKGROUND

Control of selective catalytic reduction (SCR) catalysts is of increasing interest to meet modern internal combustion engine emissions standards. The effectiveness of a typical SCR catalyst in removing oxides of nitrogen ($NO_x$) emissions is sensitive to the temperature of the exhaust gas at the inlet to the SCR catalyst. Current catalyst formulations typically operate at peak efficiency when subjected to exhaust gas temperatures of 200-400° C. For certification of certain diesel engines, the emissions performance of the engine during the cold portion of the certification cycle is weighted almost equally with the emissions performance of the engine during the hot portion of the certification cycle. For this reason, improvements in preventing hydrocarbon (HC) and $NO_x$ emissions produced by the engine from slipping through the aftertreatment system at low temperature exhaust conditions, such as at temperatures less than about 200° C., as well as high temperature conditions, such as those in excess of 400° C., are desired.

Typical diesel A/T systems include a diesel oxidation catalyst (DOC) and a diesel particulate filter (DPF) in addition to the SCR catalyst. The DOC is responsible for oxidation of hydrocarbons (HC), carbon monoxide (CO), and nitric oxide (NO). Similar to the SCR catalyst, the DOC is not able to effectively and efficiently oxidize these molecules at cold exhaust temperatures. Furthermore, regeneration of aftertreatment components and the high temperatures associated with the same increases the consumption of reductant. Improvements in aftertreatment designs are required to mitigate the slip of these criteria pollutants through the exhaust flowpath during low temperature and high temperature operations and to reduce reductant consumption. Accordingly, further technological developments in this area are desirable.

SUMMARY

There is disclosed unique methods and systems for managing low temperature $NO_x$ and HC emissions to improve the $NO_x$ and HC conversion efficiency of diesel aftertreatment systems under low and high exhaust temperature conditions. In some embodiments, there is provided a multiple component aftertreatment system that includes passively operated HC and $NO_x$ storage devices, an oxidation device, and a particulate filter having a selective catalytic reduction (SCR) portion for improved low and high temperature mitigation of $NO_x$ and/or HC emissions to achieve desired emissions levels for light duty vehicles, although applications with other vehicles are not precluded. In certain embodiments, the particulate filter is a close-coupled diesel particulate filter. In other embodiments, a close-coupled diesel particulate filter-SCR portion is provided with either a separate SCR catalyst adjacent the particulate filter, or as an SCR washcoat applied to the particulate filter.

Embodiments of the systems and methods further include a second SCR element downstream of a close-coupled particulate filter-SCR portion (DPF-SCR portion) and reductant injectors upstream and downstream of the DPF-SCR portion for injection of reductant in one or both of the reductant injection locations in response to certain operating conditions. Further embodiments include connecting the SCR portion of the DPF-SCR portion to the second SCR element at a separate distance that allows the second SCR element to be operating in a different temperature regime than the SCR portion under certain operating conditions to improve the NOx reduction efficiency of the second SCR element. Still other embodiments include a mixer upstream of the DPF-SCR element and/or a mixer downstream of DPF-SCR element and upstream of the second SCR element improve reductant mixing and flow distribution of the reductant across any cross-section upstream of the respective SCR portion or element.

The systems and methods reduce the need for external devices intended to artificially increase the exhaust gas temperature for cold start cycles, which is beneficial since such external devices tend to increase fuel consumption and greenhouse gas emissions, although the use of such external devices are not precluded. The systems and methods disclosed herein provide reductions in cost, fuel consumption and/or reductant consumption over current thermal management strategies to mitigate low temperature $NO_x$ and HC emissions. Close-coupled can include being provided as close as practical at a position downstream of a turbine portion of a turbocharger or exhaust manifold, provided within a specified distance downstream of the turbine or exhaust manifold (such as within 12 inches), and/or provided within a specified heat transfer regime or region that is different than the second SCR element downstream of the DPF-SCR element.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

There are disclosed systems and methods for reduction in HC and $NO_x$ emissions at low exhaust temperature operating conditions for an internal combustion engine. The systems and methods reduce criteria pollutants at least during low exhaust temperature conditions. The disclosed systems and methods are configured so that the vehicles equipped therewith are operable to meet emissions standards during low exhaust temperature operating conditions without the need for external aftertreatment heating systems, which increase fuel consumption and greenhouse gas emissions from the vehicle, although the use of such external systems is not precluded. In one embodiment, the systems and methods have application for light duty certified chassis vehicles, although applications with other vehicle types are not precluded.

The systems and methods include an aftertreatment system architecture configured to temporarily store HC emissions and $NO_x$ emissions during periods of low exhaust temperature operation, and then passively release the stored $NO_x$ and HC emissions for aftertreatment as the exhaust temperature increases. The systems and methods are configured so that at temperatures where HC and $NO_x$ emissions are released, the diesel oxidation catalyst (DOC) and SCR catalysts are effective at mitigating the released HC and $NO_x$ emissions from the storage devices before exiting the tailpipe.

In one embodiment, the aftertreatment system includes a close-coupled HC storage device (HCSD) located directly downstream of a turbocharger, with a close-coupled $NO_x$ storage device (NSD) located directly downstream of the HCSD. In another embodiment, the NSD is upstream of the HCSD. At low exhaust temperatures, the HCSD readily adsorbs and stores HC. In one specific embodiment, the HCSD includes a catalyst, such as a zeolite-based catalyst, for storing and adsorbing HC, but could be any suitable storage media for a hydrocarbon storage device. As the exhaust temperature increases, the HCSD releases stored HCs that are stored by the HCSD which are then effectively oxidized by a downstream close-coupled oxidation catalyst, such as a diesel oxidation catalyst (DOC), to form $H_2O$ and $CO_2$. The NSD is any suitable component, such as a $NO_x$ adsorber, capable of passively storing $NO_x$ at low exhaust temperature, and then releasing the stored $NO_x$ as the exhaust temperature increases. As the temperature of the exhaust gas increases, the NSD releases $NO_x$ and the NO portion of the $NO_x$ is partially oxidized to form $NO_2$ before being converted to $N_2$ and $H_2O$ by a DPF-SCR portion that is downstream of the DOC. In one embodiment, the HCSD, NSD, and DOC are separate devices. In other embodiments, the HSCD, NSD and DOC are integrated in a single catalyst element that performs all the functions described above. In still another embodiment, the DPF-SCR portion is a close-coupled device with the exhaust manifold, although embodiments without a close-coupled DPF-SCR portion are envisioned.

In a further embodiment, a reductant system is provided for injection of a reductant upstream of the DPF-SCR portion to facilitate $NO_x$ conversion over the DPF-SCR portion during low temperature operating conditions, although operation for $NO_x$ conversion in other temperature operating conditions is not precluded. In one embodiment, the reductant is supplied to the exhaust stream as a gaseous reductant to avoid the disadvantages of a liquid reductant at low temperature operating conditions. In one embodiment, the gaseous reductant is stored with a solid storage media, although other gaseous reductant storage/conversion devices are also contemplated. In another embodiment, the reductant is stored in a liquid medium and provided to the exhaust stream as a liquid for hydrolysis in the exhaust stream. In a further embodiment, a second SCR element is provided downstream of the DPF-SCR portion and a second reductant location is provided upstream of the second SCR element and downstream of the DPF-SCR portion. The second reductant location can utilize gaseous reductant from the gaseous reductant source, or liquid reductant from a second source of liquid reductant, to facilitate $NO_x$ conversion over the second SCR element. In a further embodiment, the downstream SCR element is connected to the DPF-SCR portion with an exhaust conduit that provides a cooling separation distance to allow the second SCR element to be utilized with reductant injection at the second location for $NO_x$ reduction during a regeneration event associated with the upstream components. The second SCR element can also be used for $NO_x$ conversion during regular, non-high temperature operating conditions. In still other embodiments, reductant is provided at the second location in response to the ammonia storage conditions of the DPF-SCR portion and/or the ability of the DPF-SCR portion to effectively treat the current level of $NO_x$ in the exhaust stream.

Figure 1:
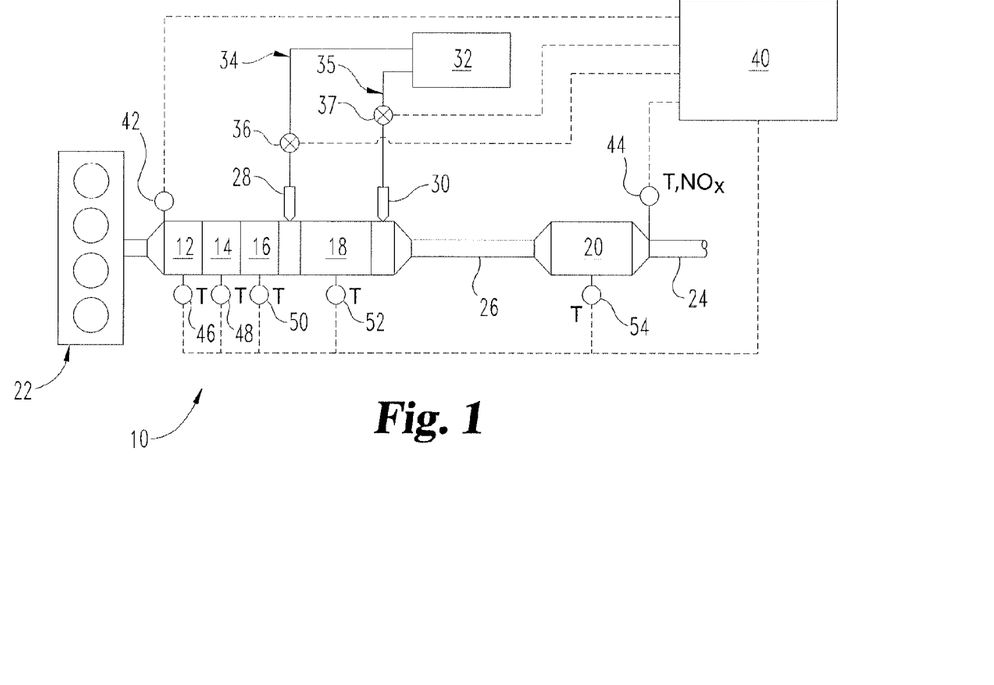
FIG. 1 is a block diagram of an exemplary system for reducing emissions of HC and $NO_x$ of an internal combustion engine during low exhaust temperature operating conditions.

Systems and methods for reducing the emission of HC and $NO_x$ from lean burn internal combustion engines for low exhaust temperature operating conditions are also disclosed in FIG. 1. As shown in FIG. 1, an exemplary aftertreatment system 10 includes a close-coupled HCSD 12 and NSD 14 followed by a close-coupled DOC 16, and close-coupled DPF-SCR device 18. Aftertreatment system 10 further includes a second or downstream SCR element 20 that can be a standard SCR or NAC-type $NO_x$ reduction catalyst. Elements 12, 14, 16, 18 and 20 are configured to receive exhaust gas in an exhaust stream produced by an internal combustion engine 22 into exhaust flowpath 24. The HCSD 12 and NSD 14 are passively operated storage devices, which require little or no active control strategies, although the use of active control strategies is not precluded. DPF-SCR device 18 includes a particulate filter and an SCR portion, either as a separate SCR element or a washcoat applied to the particulate filter, that is connected to and separated from second SCR element 20 by an exhaust cooling distance, such as with an exhaust cooling conduit 26. As discussed further below, the exhaust cooling distance allows exhaust to cool before reaching second SCR element 20 in response to, for example, a regeneration event or other high temperature condition of upstream elements 12, 14, 16 and 18, so that second SCR element 20 operates in a different temperature range than DPF-SCR device 18 in certain operating conditions.

Figure 2:
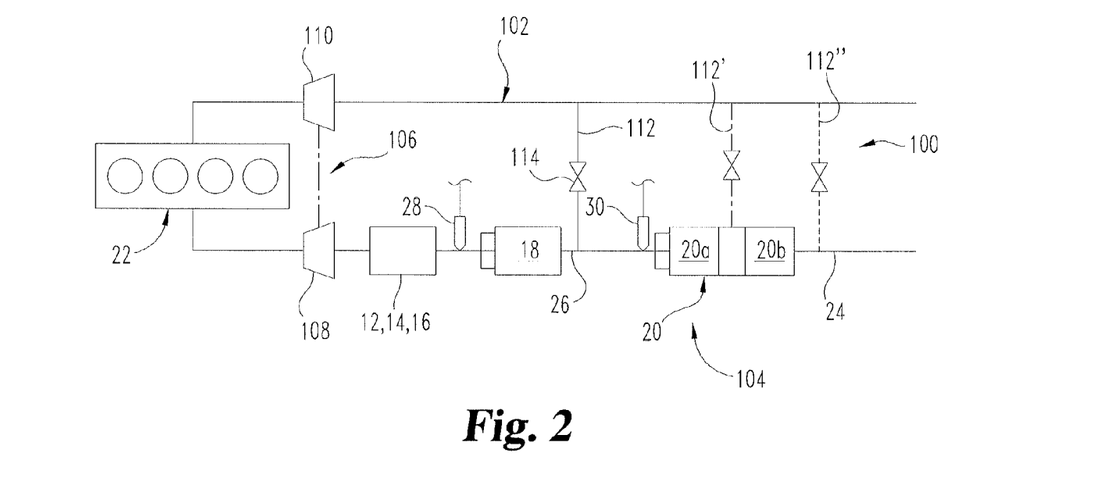
FIG. 2 is a block diagram of various embodiments of the system of FIG. 1.

In other embodiments of FIG. 1, such as shown in FIG. 2, a low pressure exhaust gas recirculation (LPEGR) system 100 may be provided to re-circulate exhaust gas to the intake system 102 from the exhaust system 104 at a location downstream of a turbine 108 of a turbocharger 106. Turbocharger 106 may include a compressor 110 in intake system 102 that is driven by turbine 108. LPEGR system 100 includes an LPEGR conduit 112 connecting exhaust system 104 to intake system 102 with an EGR flow control valve 114 that is controllable with controller 40 to control EGR flow. The LPEGR conduit 112 may be taken from one of a number of locations of the exhaust system. For example, the LPEGR conduit 112 may be located downstream of the DPF-SCR device 18 and upstream of the second SCR element 20. In another embodiment, such as shown with LPEGR conduit 112', EGR flow is taken from a location that is between two parts 20a and 20b of the second SCR element 20. Alternatively, as shown with LPEGR conduit 112", EGR flow can be taken from a location that is downstream of second SCR element 20. The LPEGR system 100 may or may not impact the HC and NOx emissions at low temperature operating conditions, and the controller 40 (discussed below) can be configured to take into account LPEGR operations in determining the reductant injection strategy.

At low exhaust gas temperatures which result in low catalyst temperatures, the HCSD 12 in one embodiment is configured to readily adsorb and store HCs until the HCSD 12 reaches a temperature where it can effectively release the HCs to DOC 16, which oxidizes the stored HC to form $CO_2$ and $H_2O$. In addition, the NSD 14 can be configured to readily adsorb and store $NO_x$ with its catalyst under low exhaust temperature conditions, and then begins to desorb this $NO_x$ as the exhaust temperature and therefore the NSD catalyst temperature increases. The NSD 14 is configured to release the stored $NO_x$ at an exhaust temperature where the released NO portion of the $NO_x$ is oxidized and converted to $NO_2$ at DOC 16, and further where $NO_x$ is treated at DPF-SCR device 18 for reducing $NO_x$ to $N_2$ and $H_2O$. Once the aftertreatment system 10 reaches operating temperature, the DOC 16 is responsible for the oxidation of HC, CO and NO in the exhaust gas. DPF-SCR device 18 may be combined as a single element as shown by, for example, applying an SCR washcoat portion to a particulate filter substrate, or split into a separate DPF portion and SCR portion in a common housing, or separated in different housings.

In one embodiment, the exhaust aftertreatment system 10 includes a DOC 16 that is operable to catalyze oxidation of one or more compounds in the exhaust gas flowing through exhaust flow path 24, for example, oxidation of unburned hydrocarbons or oxidation of NO to $NO_2$. Oxidation catalyst 16 can be any of various flow-through oxidation catalysts. Generally, oxidation catalyst 16 includes a substrate with an active catalyst layer configured to oxidize at least some particulate matter (e.g., the soluble organic fraction of soot) in the exhaust and reduce unburned hydrocarbons and CO in the exhaust to less environmentally harmful compounds. For example, in some implementations, the oxidation catalyst 16 may sufficiently reduce the hydrocarbon and CO concentrations in the exhaust to meet the requisite emissions standards.

The exhaust aftertreatment system 10 may also include a DPF-SCR device 18 with a particulate filter configured to reduce the level of particulates in exhaust flowing through exhaust flow path 24. In an exemplary embodiment the particulate filter portion is a catalyzed soot filter. DPF-SCR device 18 can be any of various particulate filters known in the art configured to reduce particulate matter concentrations, e.g., soot and ash, in the exhaust gas to meet requisite emission standards. The DPF-SCR device 18 includes a filter substrate that captures soot and other particulate matter generated by the engine 22. In one embodiment the system 10 is configured to periodically regenerate DPF-SCR device 18 to remove particulate matter that has accumulated on the particulate filter portion over time. For example, DPF-SCR device 18 can be regenerated by increasing the temperature of the exhaust gas above a threshold temperature corresponding with combustion of the particulate matter. The temperature threshold can be associated with a high temperature operating condition. In one embodiment, the temperature threshold is 400° C. Other embodiments contemplate other temperature thresholds ranging from 350° C. to 500° C.

The SCR catalyst washcoat or SCR catalyst of DPF-SCR device 18 and/or second SCR element 20 can be configured so that reductant gas or liquid injected into exhaust flow path 24 is provided thereto and is catalyzed for the reduction of $NO_x$ in the exhaust gas. SCR catalyst washcoat and/or SCR catalyst elements can be any of various catalysts known in the art. For example, in some implementations, the SCR catalyst and/or washcoat is a zeolite based catalyst, such as a Cu-Zeolite or a Fe-Zeolite catalyst, or a vanadium based catalyst. The formulation of the SCR portion of DPF-SCR device 18 and SCR element 20 can be the same or different from one another.

System 10 further includes a first reductant injector 28 upstream of DPF-SCR device 18 and a second reductant injector 30 downstream of DPF-SCR device 18 and upstream of second SCR element 20. Reductant injectors 28, 30 are connected to a reductant source 32. In one embodiment, reductant source 32 stores an amount of a dry NOx reductant such as, for example, ammonia ($NH_3$), in a solid storage media, although any suitable storage for a gaseous reductant is contemplated. In other embodiments, reductant source 32 is a source of liquid reductant. In one embodiment, the solid storage media may be any material involving adsorption or absorption of molecular ammonia in the solid, or a solid chemical compound which can be manipulated in order to produce gaseous ammonia. In one particular embodiment, the solid storage media includes metal ammine salts. The NOx reductant stored in the solid storage media housed in reductant source 32 may be ammonia or any other reductant understood in the art capable of being stored and selectively released from a solid storage media. Reductant source 32 may include a cartridge or housing providing one or more storage units having one or more compartments for storing ammonia in solid storage media.

Reductant source 32 is connected to one or both of reductant injectors 28, 30 with a reductant delivery system 34, 35, respectively, that is configured to provide gaseous reductant released from the solid storage media in reductant source 32, and provides the gaseous reductant to the exhaust flow path 24 through the respective reductant injector 28, 30. Gaseous reductant passes through a reductant supply line from reductant source 32 to a metering device 36, 37 and from metering device 36, 37 to injector 28, 30 for mixing with the exhaust gas in exhaust flow path 24. The respective delivery systems 34, 35 may include sensors, control valves, heating sources, coolant lines, and other devices useful in the release of gaseous reductant from the solid storage media and in the delivery of the gaseous reductant to the exhaust flow path 24 in the desired amount, rate and timing.

In one embodiment, gaseous reductant source 32 is operatively coupled with at least one engine coolant feed line and an engine coolant return line (not shown) that provide a source of heat that heats the solid storage media stored in reductant source 32 to release the stored reductant in gaseous form. Other embodiments contemplate other means for heating the solid storage media in reductant source 32, including, for example, an electrical heating element coupled to a power source such as a battery or generator. The heat source can be embedded in the solid storage media, or can extend around the outside of the solid storage media, or a combination of these arrangements. In one embodiment, heating of the solid storage material releases gaseous $NH_3$ from the solid storage media into the respective supply line by thermal desorption. The consumption rate of the released $NH_3$ gas is measured by metering device 36, 37 as it is mixed into exhaust flow path 24. Pressure/temperature control of reductant source 32 can be provided to control the release of the reductant gas.

In an alternative embodiment, system 10 also includes a liquid reductant source (not shown) that stores an amount of liquid NOx reductant such as, for example, ammonia ($NH_3$), in a liquid storage medium. In one embodiment, the liquid storage medium is diesel exhaust fluid stored in a tank. Other liquid reductant storage mediums such as urea are also contemplated. The liquid reductant source is connected to first reductant injector 28 and/or second reductant injector 30. Alternatively, both a gaseous and a liquid reductant source are connected to and selectively operable to provide reductant to both reductant injectors 28, 30 in response to certain operating conditions.

As discussed above, SCR element 20, at least during certain operating conditions, operates in a different temperature range than the SCR portion of DPF-SCR device 18 and is located in a substantially different thermal environment than DPF-SCR device 18. An example substantially different thermal environment is a thermal environment that varies according to a temperature observed over time after an engine start event, for example. where the downstream SCR element 20 warms up more slowly, and/or warms up to a different final temperature than the upstream SCR portion of DPF-SCR device 18. Another example substantially different thermal environment is an environment having a differential heat transfer environment, either a static heat transfer environment and/or a dynamic heat transfer environment (such as when a vehicle including the system 10 is moving). Another example substantially different thermal environment is an environment where at a first range of engine operating conditions the upstream SCR portion of DPF-SCR device 18 is within a desired temperature operating range (e.g. cold-start operation, warm-up operation, and/or operations between 200° C. and 400° C.), and at a second range of engine operating conditions the downstream SCR element 20 is within a desired temperature operating range. The desired temperature operating range for each of the SCR portion of DPF-SCR device 18 and SCR element 20 may be the same temperature ranges or differing temperature ranges, and depend upon one or more of various factors understood in the art including but not limited to: catalyst formulations, space-velocity and/or catalyst volume considerations, presently stored amounts of reductant on each SCR component, and/or the presently available $NO:NO_2$ ratio at each SCR component.

Conditions defining a range of "engine operating conditions" should be understood broadly, and can include engine speed-load information, but may alternatively or additionally include, without limitation, vehicle loading (such as weight, road grade, etc.), ambient temperature, ambient pressure, ambient wind speed and direction, vehicle speed, transient or steady operation, timing and other characteristics of engine fueling (e.g. post- and/or pilot fueling events), the availability and usage of hydrocarbon dosing into the aftertreatment system, turbocharger operational characteristics (such as wastegate values, VGT position, etc.), LPEGR operational characteristics, and/or the positions or usage of any cooler bypass devices (such as EGR cooler or intercooler bypasses—not shown). Where there is overlap of the first and second range of engine operating conditions—for example where both SCR portion of DPF-SCR device 18 and SCR element 20 are within the desired operating ranges at a given engine operating condition—the controller 40 may treat NOx emissions with either or both of the SCR portion of DPF-SCR device 18 and SCR element 20 according to any desired operating principles, including without limitations any principles described herein. Example operating principles include favoring one of the SCR portion of DPF-SCR device 18 and SCR element 20 within the shared engine operating regions (e.g. always utilizing the upstream SCR portion of DPF-SCR device 18 within a given shared engine operating region), remaining with a currently utilized one of the SCR portion of DPF-SCR device 18 and SCR element 20 until a switch is dictated by entering an engine operating region where only the opposing SCR portion of DPF-SCR device 18 and SCR element 20 is favored and then switching, and/or by applying a hysteresis value to any switching. The hysteresis value may be in any units known in the art, for example a time-based hysteresis, a temperature-based hysteresis, an engine-load based hysteresis, etc.

In certain embodiments, each of the SCR portion of DPF-SCR device 18 and SCR element 20 is sized to fully treat NO emissions of the engine 12, at least for the engine operating conditions wherein the corresponding one of SCR portion of DPF-SCR device 18 and SCR element 20 is dominant or active. In certain embodiments, the SCR portion of DPF-SCR device 18 is sized to fully treat the entire exhaust stream at normal operating temperatures. In yet another embodiment, the SCR element 20 is sized to fully treat the entire exhaust gas stream at normal operating conditions, or at a second operating condition, such as at high operating temperatures. Normal operating temperatures include operating temperatures that are not high operating temperatures, operating temperatures that exist during periods wherein an aftertreatment component is not undergoing a thermally based regeneration, operating temperatures that are not cold or warm-up operating temperatures, and/or operating temperatures that are not fully loaded engine operating temperatures.

System 10 may include a controller 40 and other aftertreatment components in addition to those shown in FIG. 1. For example, system 10 may include an ammonia oxidation catalyst (AMOX) downstream of the second SCR element 20. In certain embodiments, the AMOX may not be present, or the AMOX may be commingled with the SCR element 20 (or the last SCR catalyst, where multiple SCR catalysts are present), for example with a washcoat applied toward the rear portion of the SCR element 20 that is responsive to at least partially oxidize ammonia. In other embodiments, any of these components may be present or missing, catalyzed or not catalyzed, and may be arranged in alternate order. Further, certain components or all components may be provided in the same or separate housings.

For system 10 including controller 40, controller 40 can include a number of modules structured to functionally execute operations for controlling the SCR system. In certain embodiments, the controller forms a portion of a processing subsystem including one or more computing devices having memory, processing, and communication hardware. The controller 40 may be a single device or a distributed device, and the functions of the controller may be performed by hardware or by hardware configured by software. The controller 40 may be in communication with any sensor, actuator, datalink, and/or network in the system.

The exemplary system 10 further includes various sensors. The illustrated sensors in FIG. 1 include a first $NO_x$ sensor 42 positioned upstream of the HCSD 12 and a second $NO_x$ sensor 44 positioned downstream of the second SCR element 20. Alternatively or additionally, $NO_x$ sensors (not shown) can be provided at the outlet of NSD 14, at the outlet of DPF-SCR device 18, and/or between the inlet to second SCR element 20 and the outlet of DPF-SCR device 18. System 10 also includes a first temperature sensor 46 at, for example, the inlet of HCSD 12, a second temperature sensor 48 between HCSD 12 and NSD 14, a third temperature sensor 50 at the outlet of NSD 14, and a fourth temperature sensor 52 at DPF-SCR device 18, and a fifth temperature sensor 54 at second SCR element 20. Other embodiments contemplated NOx, temperature, and/or NH3 sensors at the outlet of DOC 16 and/or the inlet to DPF-SCR device 18. Other sensors can be provided to measure or determine the mass flow through the exhaust system, the temperature of any component of the aftertreatment system, the amount of ammonia stored in one or both of SCR catalysts 18, 20 or outlet therefrom, etc.

The illustrated sensors are exemplary only, and may be re-positioned, removed, substituted, and other sensors may be present that are not illustrated in FIG. 1. Further, certain sensors may instead be virtual sensors that are calculated from other parameters available to the system 10, or values that would be indicated by sensors may instead be supplied to a computer readable memory location, via a datalink or network communication, or otherwise be made available to the system 10 where the sensor providing the sensed parameter is not a part of the defined system 10.

Figure 3:
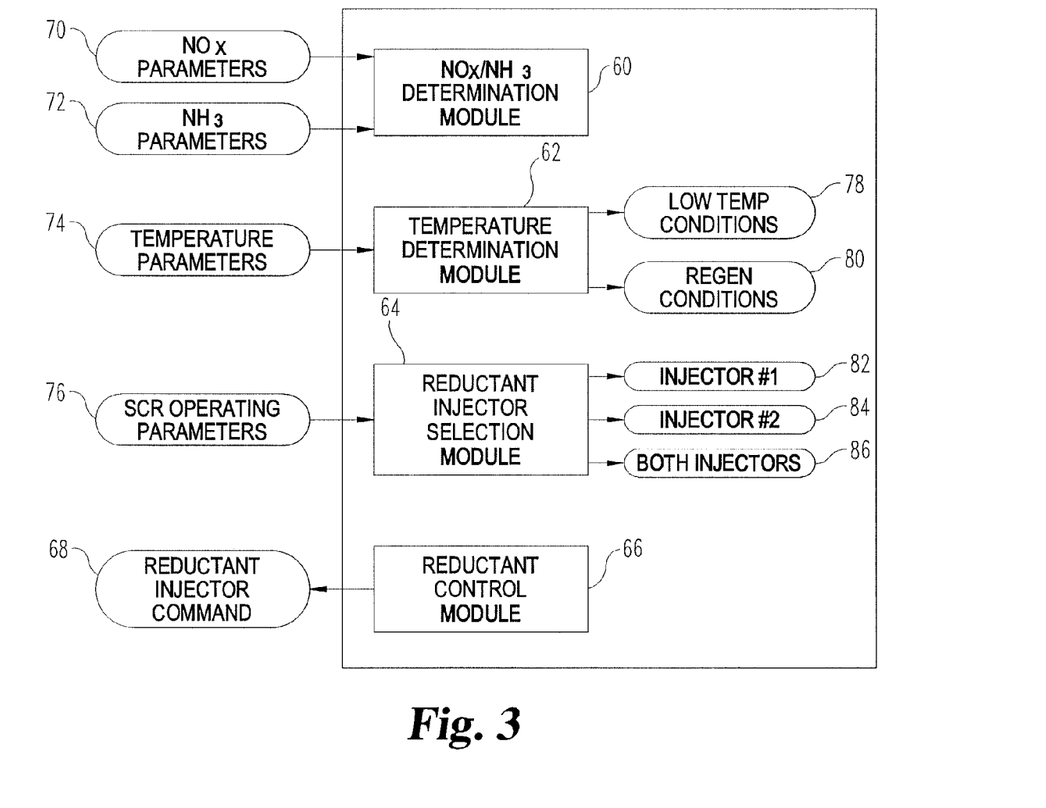
FIG. 3 is a schematic diagram of a controller comprising a portion of the system of FIG. 1.

In certain embodiments, such as shown in FIG. 3, the controller 40 includes a $NO_x$/NH3 determination module 60, a temperature determination module 62, a reductant injector selection module 64, and a reductant control module 66. The description herein including modules emphasizes the structural independence of the aspects of the controller 40, and illustrates one grouping of operations and responsibilities of the controller 40. Other groupings that execute similar overall operations are understood to be within the scope of the present application. More specific descriptions of certain embodiments of controller operations are included in the section referencing FIG. 3.

The exemplary controller 40 in FIGS. 1 and 3 is configured for executing operations to provide a reductant injector command 68 for the effective removal of $NO_x$ emissions with one or both of DPF-SCR device 18 and SCR element 20. The controller operations of the controller 40 in FIG. 2 include operations that adjust nominal control operations for a $NO_x$ aftertreatment system utilizing a reductant. Nominal control operations for a $NO_x$ aftertreatment system, including an SCR aftertreatment system, are understood in the art and are not described further herein. Any nominal $NO_x$ aftertreatment control operations may be utilized by system 10 disclosed herein.

The controller 40 includes $NO_x$/NH3 determination module 60 that receives $NO_x$ parameters 70 from $NO_x$ sensors such as sensors 42, 44 and determines an amount of $NO_x$ emitted from engine 22 and from one or both of DPF-SCR device 18 and second SCR element 20. Controller 40 can also be configured to receive inputs from sensors, determine or calculate an amount of $NO_x$ at the outlet of DPF-SCR device 18 or at any other location in system 10. $NO_x$/NH3 determination module 60 can also receive NH3 parameters 72 from NH3 sensors or by calculation from other operating parameters and determine an amount of NH3 stored, an NH3 storage capacity, and/or NH3 slip from one or both of DPF-SCR device 18 and second SCR element 20.

Controller 40 also includes a temperature determination module 62 that receives temperature parameters 74 from, for example, temperature sensors 46, 48, 50, 52, 54 to determine a temperature of the exhaust gas in flowpath 24 and/or of the various catalysts of the aftertreatment components in flowpath 24. In one embodiment, temperature determination module 62 is configured to determine a low exhaust temperature operating condition 78 and an exhaust aftertreatment component regeneration condition 80. Other temperature conditions or operating modes could also be determined and are not precluded.

Controller 40 also includes reductant injector selection module 64 configured to select one or both of reductant injectors 28, 30 from which to provide reductant in response to the operating conditions of aftertreatment system 10, such as SCR operating parameters 76 and the temperature conditions determined by temperature determination module 62. Reductant injector selection module 64 can be configured, for example, to select operation of reductant injector 28 with injector #1 selection 82, select operation of reductant injector 30 with injector #2 selection 84, or select both injectors 28, 30 with both injector selection 86. Controller 40 further includes a reductant control module 66 that determines an appropriate reductant injector command 68 for the amount of reductant to be injected in flowpath 24 to provide a desired emissions level for $NO_x$ at the outlet of one or both of DPF-SCR device 18 and second SCR element 20.

During low temperature operating conditions for engine 22 and for exhaust gas and/or aftertreatment components in flowpath 24, second SCR element 20 is ineffective in treating emissions of $NO_x$ to meet desired emissions level targets. Furthermore, traditional oxidation catalysts upstream of SCR element 20 are ineffective in removing HC to meet criteria emissions levels at low temperature operating conditions. Therefore, HCSD 12 is configured to store HC, and NSD 14 is configured to store $NO_x$ during low exhaust temperature operating conditions until the aftertreatment components of system 10 are raised to a temperature effective to remove the criteria pollutants from the emissions of engine 22.

In addition, during low temperature operating conditions 78 reductant injector selection module 64 can select reductant injector 28 to provide a gaseous reductant into the exhaust stream to improve or enable low temperature NOx reduction capabilities. Providing gaseous reductant when the temperature condition is less than the liquid reductant temperature threshold enables treatment of NOx emissions in low temperature operating conditions while avoiding or minimizing the formation of reductant deposits typically formed by dosing of liquid reductant in low temperature conditions. Accordingly, the HC and NOx storage times and required storage amounts by HCSD 12 and NSD 14 can be reduced compared to a system that only uses a liquid reductant. In still other embodiments, a liquid reductant is provided with reductant injector 28.

The amount of NOx accumulation by NSD 14 during low exhaust temperature operating conditions can be determined by the difference between the amount of $NO_x$ detected by upstream $NO_x$ sensor 42 and the corresponding amount detected by downstream $NO_x$ sensor 44 and converted by oxidation catalyst 16 during low temperature operation. In one embodiment, reductant control module 66 is configured to determine a reductant injector command 68 that only provides reductant from reductant injector 28 during low temperature operating conditions.

During other operating conditions, reductant injection can be provided by upstream reductant injector 28 if NH3 storage conditions exist on DPF-SCR device 18. If DPF-SCR device 18 lacks NH3 storage capacity, then reductant injector selection module 64 can select downstream reductant injector 30 for providing the reductant amount required by the reductant injection command. Reductant injector 30 may also be selected during high temperature operating conditions to provide a greater proportion of the reductant to avoid high temperature ammonia oxidation on the DPF-SCR device 18, reducing reductant consumption. In yet another embodiment, in response to detection of a regeneration condition 80, reductant injector selection module 64 selects downstream reductant injector 30 to provide all or a portion of the reductant to a cooler second SCR catalyst element 20 that is separated from the DPF-SCR device 18 by exhaust cooling conduit 26, while the upstream reductant injector 28 is disabled. At high regeneration temperatures, such as those in excess of 550° C., the DPF-SCR device 18 can be less effective in converting $NO_x$, so the $NO_x$ conversion occurs in downstream SCR element 20. In still other embodiments relating to low temperature and/or high temperature operating conditions, reductant can be provided simultaneously through reductant injectors 28, 30 in a proportion and amount determined by controller 40 and operations of one or both of DPF-SCR device 18 and second SCR element 20 can be provided to convert $NO_x$ in the exhaust gas to the desired levels.

Figure 4:
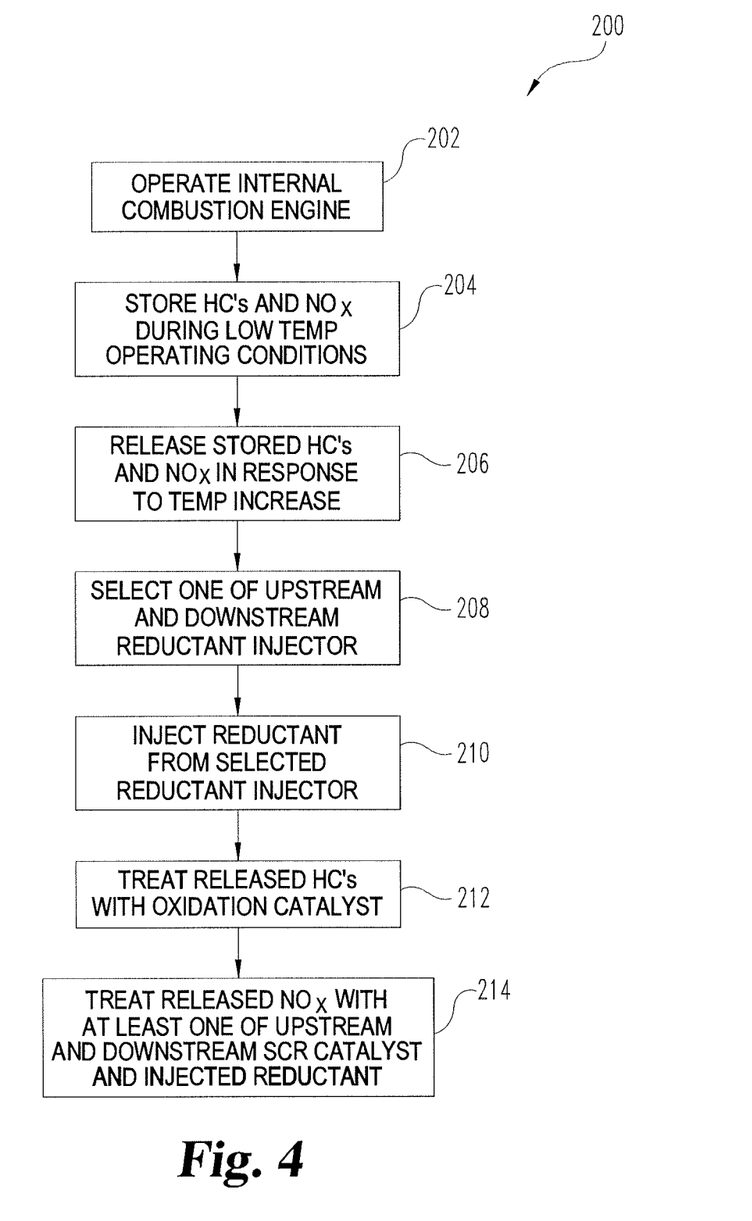
FIG. 4 is a flow diagram of a procedure for operation of the system of FIG. 1.

Referring to FIG. 4, a flow diagram of one embodiment procedure for treating exhaust emissions is shown. Procedure 200 includes an operation 202 to operate the internal combustion engine. Operation of the internal combustion engine produces an exhaust gas or exhaust stream that is provided to an aftertreatment system connected with the internal combustion engine. Procedure 200 further includes an operation 204 to store at least a portion of the hydrocarbons and oxides of nitrogen in the exhaust gas at a storage location that is close-coupled with the engine during low temperature operating conditions, such as when the aftertreatment components are ineffective or less effective in treating these constituents. In one embodiment, the low temperature operating condition is one of an engine cold start operation and a warm-up operation. In other embodiments, the low temperature operating conditions is less than an effective operating temperature ranging from 180° C. to 220° C. In other embodiments, an effective operating temperature is about 200° C. It should be understood, however, that low temperature operating temperature ranges, effective operating temperature thresholds, and high operating temperature ranges can vary based on the design and materials of the aftertreatment system components and/or the designed emissions reductions control requirements.

Procedure 200 continues at operation 206 to release the stored hydrocarbons and oxides of nitrogen from the storage location in response to an increase in the operating temperature of the exhaust system from the low temperature operating condition. The release of the hydrocarbons and/or oxides of nitrogen can be a passive release that occurs as the operating temperature increases or in response to the operating temperature of one or more components of the aftertreatment system achieving a threshold temperature or threshold temperature range. In one embodiment, hydrocarbon emissions are stored with a hydrocarbon storage device and $NO_x$ emissions are stored with a $NO_x$ storage device such as a $NO_x$ adsorber. In further embodiments the aftertreatment system includes an oxidation catalyst downstream of the storage devices, a particulate filter and a SCR portion downstream of the oxidation catalyst, and a second SCR element downstream of and in a substantially different thermal environment than the SCR portion.

Procedure 200 continues at operation 208 to select one of an upstream reductant injector and a downstream reductant injector, such as reductant injectors 28, 30 discussed herein. For example, the first reductant injector can be selected for injecting reductant into the exhaust stream at only a first location upstream of the SCR portion in response to a low temperature operating condition and the second reductant injector can be selected for injecting reductant into the exhaust stream at only a second location downstream of the SCR portion and upstream of the SCR element during high temperature operating condition such as a regeneration of the particulate filter. Procedure 200 continues at operation 210 to inject reductant from the selected reductant injector. As discussed above, in certain operating conditions, simultaneous reductant injection from both reductant injectors can be performed. In other operating conditions, a simultaneous injection of reductant at the first and second locations is prevented, such as during low temperature operating conditions and during the regeneration of the particulate filter.

Procedure 200 continues at operation 212 to treat the released hydrocarbons with an oxidation catalyst downstream of the hydrocarbon storage location. Procedure 200 also includes an operation 214 to treat the released oxides of nitrogen with at least one of the SCR portion and the downstream SCR element and the reductant injected from the selected corresponding reductant injector. The amount of reductant injected into the exhaust flowpath is determined as an amount that is sufficient for at least one of the SCR portion and the second SCR element to convert a desired amount of the $NO_x$ emissions from the internal combustion engine. As discussed above, the reductant can be a liquid reductant from both injectors, a gaseous reductant from both injectors, or a gaseous reductant from the upstream reductant injector and a liquid reductant from the downstream reductant injector.

As is evident from the figures and text presented above, a variety of aspects aspect of the present disclosure are contemplated.

One aspect includes an exemplary set of embodiments directed to a method that includes storing at a location in an exhaust flowpath hydrocarbon and $NO_x$ emissions from an internal combustion engine during low exhaust temperature operation; releasing the stored hydrocarbons and $NO_x$ emissions into the exhaust flowpath as the exhaust temperature increases toward an effective operating temperature; and treating the released hydrocarbons and $NO_x$ emissions downstream of the storage location with an oxidation catalyst, a particulate filter and an SCR portion, and a second SCR element downstream of the SCR portion of the particulate filter.

In certain embodiments, the method includes storing hydrocarbon emissions with a hydrocarbon storage device. In other embodiments, the method includes storing $NO_x$ emissions with a $NO_x$ storage device. In other embodiments, the $NO_x$ storage device is a $NO_x$ adsorber. In certain embodiments, the effective operating temperature is around 200° Celsius. In other embodiments, the method further includes selecting a reductant injector location upstream of the SCR portion of the particulate filter and/or downstream of the SCR portion of the particulate filter in response to an operating temperature of the exhaust gas so that a reductant amount injected into the exhaust flowpath is sufficient for at least one of the SCR portion and the second SCR element to convert a desired amount of the $NO_x$ emissions from the internal combustion engine. In one embodiment, the reductant is gaseous reductant supplied to the first and second reductant injectors. In another embodiment, gaseous reductant is supplied to the first reductant injector and liquid reductant is supplied to the second reductant injector.

Another aspect includes an exemplary set of embodiments directed to a method that includes operating an internal combustion engine to produce an exhaust stream; storing hydrocarbons and oxides of nitrogen in the exhaust stream during low temperature operating conditions with at least one storage device close-coupled with the engine that receives the exhaust stream, and further including an oxidation catalyst downstream of the at least one storage device, a particulate filter and an SCR portion downstream of the oxidation catalyst, and a second SCR element downstream of the SCR portion; releasing the stored hydrocarbons and oxides of nitrogen in response to an increase in operating temperatures from the low temperature operating conditions; treating the released hydrocarbons and oxides of nitrogen with the oxidation catalyst, the particulate filter and the SCR portion, wherein the treating includes delivering reductant to one of a first location upstream of the SCR portion and a second location that is downstream of the SCR portion and upstream of the second SCR element, where the second SCR element is positioned in a substantially different thermal environment than the SCR portion when the internal combustion engine is producing the exhaust stream.

In one embodiment, the method includes injecting reductant into the exhaust stream at only the first location in response to a low temperature operating condition and injecting reductant into the exhaust stream at only the second location during a regeneration of the particulate filter. In a refinement of this embodiment, the low temperature operating condition is one of an engine cold start operation and a warm-up operation. In another refinement, the method includes preventing a simultaneous injection of reductant at the first and second locations during the low temperature operating condition and during the regeneration of the particulate filter.

Another aspect and exemplary set of embodiments is directed to a system that includes an internal combustion engine and an exhaust conduit fluidly coupled to the internal combustion engine. The system includes at least one close-coupled device fluidly coupled to the exhaust conduit that is configured to provide a storage location for hydrocarbons and oxides of nitrogen in an exhaust gas produced by the internal combustion engine during low temperature operating conditions. The at least one close-coupled device further includes an oxidation catalyst downstream of the storage location of the hydrocarbons and oxides of nitrogen, a close-coupled particulate filter and a SCR portion fluidly coupled to the exhaust conduit downstream of the oxidation catalyst. A second SCR element is fluidly coupled to the exhaust conduit downstream of the SCR portion. The system includes a first reductant injector upstream of the SCR portion configured to selectively provide a reductant to the exhaust flow path in response to a first reductant injector command, and a second reductant injector downstream of the SCR portion and upstream of the second SCR element configured to selectively provide the reductant to the exhaust flow path in response to a second reductant injector command.

In one embodiment, the system includes the SCR portion connected to the second SCR element by a separation distance that provides exhaust cooling from the SCR portion to the second SCR element. In another embodiment, a source of liquid reductant is coupled to each of the first and second reductant injectors. In yet another embodiment, a source of gaseous reductant is coupled at least to the first reductant injector. In a refinement of this embodiment, the source of gaseous reductant is coupled to each of the first and second reductant injectors. In a further refinement, the first reductant injector command provides gaseous reductant to the exhaust gas only from the first reductant injector during at least low temperature operating conditions of the second SCR element, and the second reductant injector command provides gaseous reductant to the exhaust gas only from the second reductant injector during at least a high temperature operating condition associated with regeneration of the particulate filter.

In another embodiment, the SCR portion is applied as a washcoat to the particulate filter. In yet another embodiment, the at least one storage device includes a separate device for each of hydrocarbon storage, oxides of nitrogen storage, and the oxidation catalyst. In another embodiment, the at least one storage device includes a combined device for hydrocarbon storage, oxides of nitrogen storage, and the oxidation catalyst.

In a further embodiment, the system includes a controller with a $NO_x$ determination module structured to determine a $NO_x$ amount at an outlet of at least one of the SCR portion of the particulate filter and the second SCR element; a temperature determination module structured to determine a present operating temperature of the exhaust gas in the exhaust flowpath; an injector selection module structured to select at least one of the first reductant injector and the second reductant injector for reductant injection in response to the present operating temperature; and a reductant control module structured to determine a corresponding one of the first and second reductant injector commands for the selected one of the first and second reductant injectors in response to the $NO_x$ amount to achieve a desired $NO_x$ conversion by at least one of the SCR portion and the SCR element. In one refinement of this embodiment, the injector selection module is structured to select the first reductant injector in response to the present operating temperature indicating low exhaust temperature operating conditions. In another refinement, the injector selection module is structured to select the second reductant injector in response to the present operating temperature indicating regeneration of the particulate filter.

Yet another aspect and exemplary set of embodiments includes a system with an internal combustion engine capable of producing an exhaust stream and an aftertreatment system operationally coupled to receive the exhaust stream produced by the internal combustion engine. The aftertreatment system includes at least one close-coupled device that is configured to provide a storage location for hydrocarbons and oxides of nitrogen in the exhaust stream during low temperature operating conditions. The at least one close-coupled device further includes an oxidation catalyst downstream of the storage location of the hydrocarbons and oxides of nitrogen, a close-coupled particulate filter and a SCR portion downstream of the oxidation catalyst, and a second SCR element downstream of the particulate filter and SCR portion. The second SCR element is positioned in a substantially different thermal environment than the SCR portion when the internal combustion engine is producing the exhaust stream. The system also includes a reductant source fluidly coupled to a first reductant injector upstream of the SCR portion and a second reductant injector downstream of the SCR portion. The first and second reductant injectors are configured to selectively provide a reductant to the exhaust stream.

In one embodiment, the reductant in the reductant source is a liquid reductant. In another embodiment, the reductant in the reductant source is a gaseous reductant. In a refinement of this embodiment, the gaseous reductant is supplied to the exhaust stream from only the first reductant injector during at least low temperature operating conditions of the second SCR element. In a further refinement, reductant is supplied to the exhaust stream from only the second reductant injector during at least a high temperature operating condition associated with regeneration of the particulate filter. In another embodiment, the SCR portion is included as a washcoat on the particulate filter. In yet another embodiment, the at least one storage device includes a separate device for each of hydrocarbon storage, oxides of nitrogen storage, and the oxidation catalyst. In still another embodiment, the at least one storage device includes a combined device for hydrocarbon storage, oxides of nitrogen storage, and the oxidation catalyst.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
an internal combustion engine;
an exhaust conduit fluidly coupled to the internal combustion engine;
at least one close-coupled device fluidly coupled to the exhaust conduit that is configured to provide a storage location for hydrocarbons and oxides of nitrogen in an exhaust gas produced by the internal combustion engine during at least one of an engine cold start operating condition and a catalyst warm up operating condition, the at least one close-coupled device further including an oxidation catalyst downstream of the storage location of the hydrocarbons and oxides of nitrogen and a combination particulate filter/selective catalytic reduction (SCR) portion fluidly coupled to the exhaust conduit downstream of the oxidation catalyst;
a second SCR element fluidly coupled to the exhaust conduit downstream of the combination particulate filter/SCR portion;
a first reductant injector upstream of the combination particulate filter/SCR portion configured to selectively provide a reductant to the exhaust flow path in response to a first reductant injector command; and
a second reductant injector downstream of the combination particulate filter/SCR portion and upstream of the second SCR element configured to selectively provide the reductant to the exhaust flow path in response to a second reductant injector command.

2. The system of claim 1, further comprising the combination particulate filter/SCR portion connected to the second SCR element by a separation distance that provides exhaust cooling from the combination particulate filter/SCR portion to the second SCR element.

3. The system of claim 1, further comprising a source of liquid reductant coupled to each of the first and second reductant injectors.

4. The system of claim 1, further comprising a source of gaseous reductant coupled at least to the first reductant injector.

5. The system of claim 4, wherein the source of gaseous reductant is coupled to each of the first and second reductant injectors.

6. The system of claim 5, wherein the first reductant injector command provides gaseous reductant to the exhaust gas only from the first reductant injector during the at least one of the engine cold start operating condition and catalyst warm up operating condition.

7. The system of claim 6, wherein the second reductant injector command provides gaseous reductant to the exhaust gas only from the second reductant injector during at least regeneration of the particulate filter.

8. The system of claim 1, wherein the SCR portion of the combination particulate filter/SCR portion is included with the particulate filter as a washcoat.

9. The system of claim 1, wherein the at least one storage device includes a separate device for each of hydrocarbon storage, oxides of nitrogen storage, and the oxidation catalyst.

10. The system of claim 1, wherein the at least one storage device includes a combined device for hydrocarbon storage, oxides of nitrogen storage, and the oxidation catalyst.

11. The system of claim 1, further comprising a controller configured to:
determine an $NO_x$ amount at an outlet of at least one of the combination particulate filter/SCR portion and the second SCR element;
determine a present operating temperature of the exhaust gas;
select at least one of the first reductant injector and the second reductant injector in response to the present operating temperature; and
execute a corresponding one of the first and second reductant injector commands for the selected one of the first and second reductant injectors in response to the $NO_x$ amount for $NO_x$ conversion by at least one of the combination particulate filter/SCR portion and the SCR element.

12. The system of claim 11, wherein the controller is configured to select the first reductant injector in response to the present operating temperature indicating the at least one of the engine cold start operating condition and the catalyst warm up operating condition.

13. The system of claim 11, wherein the controller is configured to select the second reductant injector in response to the present operating temperature indicating a regeneration of the particulate filter.

14. A system, comprising:
an internal combustion engine capable of producing an exhaust stream;
an aftertreatment system operationally coupled to receive the exhaust stream produced by the internal combustion engine, the aftertreatment system comprising:
at least one close-coupled device that is configured to provide a storage location for hydrocarbons and oxides of nitrogen in the exhaust stream during at least one of an engine cold start operating condition and a catalyst warm up operating condition, the at least one close-coupled device further including an oxidation catalyst downstream of the storage location of the hydrocarbons and oxides of nitrogen;
a close-coupled combination particulate filter/selective catalytic reduction (SCR) portion downstream of the oxidation catalyst;
a second SCR element downstream of the combination particulate filter/SCR portion, wherein the second SCR element is positioned in a substantially different thermal environment than the combination particulate filter/SCR portion when the internal combustion engine is producing the exhaust stream; and a reductant source fluidly coupled to a first reductant injector upstream of the combination particulate filter/SCR portion and a second reductant injector downstream of the combination particulate filter/SCR portion, wherein the first and second reductant injectors are configured to selectively provide a reductant to the exhaust stream.

15. The system of claim 14, wherein the reductant in the reductant source is a liquid reductant.

16. The system of claim 14, wherein the reductant in the reductant source is a gaseous reductant.

17. The system of claim 16, wherein the gaseous reductant is supplied to the exhaust stream from only the first reductant injector during the at least one of the engine cold start operating condition and the catalyst warm up operating condition.

18. The system of claim 17, wherein reductant is supplied to the exhaust stream from only the second reductant injector during at least regeneration of the particulate filter.

19. The system of claim 14, wherein the SCR portion of the combination particulate filter/SCR portion is included as a washcoat on the particulate filter.

20. The system of claim 14, wherein the at least one storage device includes a separate device for each of hydrocarbon storage, oxides of nitrogen storage, and the oxidation catalyst.

21. The system of claim 14, wherein the at least one storage device includes a combined device for hydrocarbon storage, oxides of nitrogen storage, and the oxidation catalyst.

22. A method, comprising:
operating an internal combustion engine to produce an exhaust stream;
storing hydrocarbons and oxides of nitrogen in the exhaust stream during at least one of an engine cold start operating condition and a catalyst warm up operating condition with at least one storage device close-coupled with the engine that receives the exhaust stream, and further including an oxidation catalyst downstream of the at least one storage device, a combination particulate filter/selective catalytic reduction (SCR) portion downstream of the oxidation catalyst, and a second SCR element downstream of the SCR portion;
releasing the stored hydrocarbons and oxides of nitrogen in response to an increase in operating temperatures from the at least one of the engine cold start operating condition and the catalyst warm up operating condition;
treating the released hydrocarbons and oxides of nitrogen with the oxidation catalyst and the combination particulate filter/SCR portion, wherein the treating includes delivering reductant to one of a first location upstream of the combination particulate filter/SCR portion and a second location that is downstream of the combination particulate filter/SCR portion and upstream of the second SCR element, wherein the second SCR element is positioned in a substantially different thermal environment than the combination particulate filter/SCR portion when the internal combustion engine is producing the exhaust stream.

23. The method of claim 22, further comprising:
injecting reductant into the exhaust stream at only the first location in response to the at least one of the engine cold start operating condition and catalyst warm up operating condition; and
injecting reductant into the exhaust stream at only the second location during a regeneration of the particulate filter.

24. The method of claim 23, wherein the at least one of the engine cold start operating condition and the catalyst warm operating condition occurs at temperatures less than about 200° C.

25. The method of claim 23, further comprising preventing a simultaneous injection of reductant at the first and second locations during the at least one of the engine cold start operating condition and the catalyst warm up operating condition and during the regeneration of the particulate filter.

26. A method, comprising:
storing at a location in an exhaust flowpath hydrocarbon and $NO_x$ emissions from an internal combustion engine during at least one of an engine cold start operation and a catalyst warm up operation;
releasing the stored hydrocarbons and $NO_x$ emissions into the exhaust flowpath as an exhaust temperature increases toward a normal operating temperature; and
treating the released hydrocarbons and $NO_x$ emissions downstream of the storage location with an oxidation catalyst, a combination particulate filter/SCR portion downstream of the oxidation catalyst, and a second SCR element downstream of the combination particulate filter/SCR portion.

27. The method of claim 26, wherein hydrocarbon emissions are stored with a hydrocarbon storage device and $NO_x$ emissions are stored with a $NO_x$ storage device.

28. The method of claim 27, wherein the $NO_x$ storage device is a $NO_x$ adsorber.

29. The method of claim 26, wherein the normal effective operating temperature is about 200° Celsius.

30. The method of claim 26, further comprising:
selecting one of a first reductant injector location upstream of the combination particulate filter/SCR portion and a second reductant injector downstream of the combination particulate filter/SCR portion in response to the exhaust temperature; and
injecting a reductant into the exhaust flowpath in an amount that is sufficient for at least one of the combination particulate filter/SCR portion and the second SCR element to convert a target amount of the $NO_x$ emissions from the internal combustion engine.

31. The method of claim 30, wherein the reductant is a gaseous reductant supplied to the first and second reductant injectors.

32. The method of claim 30, wherein the reductant includes a gaseous reductant supplied to the first reductant injector and a liquid reductant supplied to the second reductant injector.

* * * * *